United States Patent Office 3,335,104
Patented Aug. 8, 1967

3,335,104
STABILIZATION OF CRYSTALLINE
POLYPROPYLENE
Adam F. Kopacki, Westwood, and Robert H. Messing, Lyndhurst, N.J., and Gerald Levine, Brooklyn, N.Y., assignors to Stauffer Chemical Company, New York, N.Y., a corporation of Delaware
No Drawing. Filed June 22, 1962, Ser. No. 204,612
13 Claims. (Cl. 260—23)

This invention relates to the stabilization of isotactic or highly crystalline polypropylene. More particular the invention pertains to the stabilization of the aforesaid polypropylene by means of a stabilizing composition comprising a bis phenolic sulfide stabilizer or antioxidant and an antistain or decolorizing agent.

A recent development in the polymerization art is the synthesis of stereoregular polymers. These are precisely constructed polymers, the monomeric units of which are linked up in an end-to-end fashion thereby forming elongated molecular chains. Moreover, the substituents attached to the chain are systematically disposed, an arrangement which tends to promote an orderly and close alignment of the filamentary-like molecules. Such stereoregular polymers exhibit a high degree of crystallinity and are much superior in physical properties to amorphous polymers having a random distribution of substituents affixed to the molecular chain. For a fuller description of crystalline polymers, reference is made to the Scientific American, 197 No. 3, pp. 98–104 (1957); 205 No. 2, pp. 33–41 (1961).

A stereoregular polymer of the polyolefin type which has recently attracted wide attention is crystalline polypropylene. Because of its superior physical properties, this crystalline polymer has been extensively developed and is now available on the commercial market in a variety of forms including castings, films and fibers.

The highly crystalline polypropylenes have melt indices when measured at 190° C. ranging from about 0.01 to 50 and it is this physical characteristic which renders these polymers particularly useful in the production of synthetic fibers and films. Other desirable and beneficial physical properties of crystalline polypropylene includes exceptional transparency, high mechanical strength and resistance to chemicals and solvents.

Despite the excellent physical chemical properties of crystalline polypropylene, it is unfortunately susceptible to deterioration at elevated temperatures apparently as a result of oxidative degradation. The rapidity with which crystalline polypropylene undergoes air oxidation is vividly demonstrated by heating melt spun polypropylene fibers in a circulating air oven at 125° C. At the end of 50 hours, the fibers have lost about 50% of their strength and such treatment for 100 hours reduces them to a powdery material.

Generally all of the polypropylenes are more or less subject to air oxidation as above described, although the crystalline or stereoregular variety is especially prone to this type of degradation. It is interesting to note that a closely related polyolefin, i.e. polyethylene is not appreciably affected by air oxidation and fibers of this latter material are known to withstand 100° C. temperatures for hundreds of hours without serious loss in strength.

Manifestly, polypropylene and in particular the highly crystalline variety, requires stabilization against oxidative degradation and numerous varieties of anti-oxidants have been proposed in an effort to suppress or at least retard this undesirable feature of polypropylene. For instance, it is known to stabilize polyethylene with certain bis (dialkyl phenol) sulfides, including monosulfides and disulfides and these have been proposed as stabilizers for polypropylene including the isotactic variety. In general, however, the aforesaid disubstituted bis phenolic sulfides have not proven to be particularly effective in the polypropylene system probably due to the greater susceptibility of isotactic polypropylene to oxidative degradation.

An improved type of bis phenolic sulfide stabilizer is described in pending U.S. application Ser. No. 163,069 filed Dec. 29, 1961 now abandoned. These compounds are characterized by two phenolic residues connected through a monothio or dithio bridge and having one hydrocarbon substituent attached to each of the phenol rings. Such monosubstituted bis phenols have demonstrated a higher degree of stabilizing action than the monsubstituted derivatives when incorporated in polypropylene of the predominantly crystalline variety.

Although the bis phenolic sulfides of the application are eminently useful for stabilizing isotactic polypropylene, they tend to give rise to color or stain. In fact, this property is shared generally by phenolic sulfides. Apparently, the phenols undergo slightly decomposition when they are blended with the polymer operation which is commonly carried out at mildly elevated temperatures but is nevertheless sufficient to bring about a slight breakdown of the stabilizer.

It has now been discovered that excellent stabilization of crystalline polypropylene can be achieved by utilizing a stabilizing composition comprising a combination of a monosubstituted bis phenolic sulfide and a metallic soap, the metal of which does not form colored sulfides, and the provision of such stabilizer compositions constitutes a primary object and purpose of this invention. Another important object and purpose of the invention is to provide isotactic polypropylene stabilized with the aforesaid stabilizer compositions. Other objects and purposes will become manifest as the description proceeds.

In accordance with the present invention, it has been ascertained that excellent stabilization of isotactic or crystalline polypropylene can be achieved by incorporating in the raw polymers a stabilizing composition consisting essentially of a monosubstituted bis phenolic sulfide stabilizing agent and a metallic soap wherein the metal can be calcium barium, strontium, magnesium or zinc. The stabilizing composition should be intimately mixed with the unstabilized polymer and in this connection we have found that excellent results are produced by blending the polymer and stabilizer composition in a 2-roll milling mill at 340° F. until the ingredients are transformed into a completely homogeneous product. The color of the resulting stabilized polymer varies from an off-white to a slight straw color. In compounding the stabilizing compositions, it has been our finding that optimum results ensue when the ratio of the phenolic component to the metallic soap varies from 1:12.5 to 1:0.5. The resulting stabilizing mixture is then blended with the polymer to give a stabilized polymer composition wherein the stabilizer amounts to from 0.135% to 5.250% of the total weight. A similar processing without the metallic soap produces a product having a brown to yellow coloration.

The acidic portion of the metallic soaps which are used herein should preferably have a molecular weight of about 116 to 340 and from between 8 to 22 carbon atoms. Acids which are commonly used in preparing metallic soaps may be cyclic straight- or branch-chain saturated or unsaturated as typified by rosin, linseed oil fatty acids, hexoic acid (a syn. octoic acid) and tall oil fatty acids. Naphthenic acids are derivatives of cyclopentane and cyclohexane obtained from naphthenic base petroleum. Abietic acid, the chief acid in rosin, is a derivative of phenanthrene. Other acids are of the aliphatic type and include saturated and unsaturated members. Tall oil (QV) is composed more or less of fatty acid and rosin acids. For a more detailed description of metallic soaps and the acids used in their preparation, reference is made to "Encyclopedia of Chemical Technology," edited by Kirk and Othmer, volume 5, pages 195–196 (1950) and published by the Interscience Encyclopedia, Inc., New York.

Metallic soaps which we have found especially effective in formulating the stabilizing compositions contemplated herein include magnesium stearate, magnesium palmitate, calcium stearate, barium stearate, strontium palmitate, calcium monodecylphosphate, calcium monolaurylphosphate, zinc stearate and the like. Since the phenolic sulfides are a potential source of sulfur, the metal of the metallic soap must not form colored sulfides as such products would impart a high degree of color to the polymer.

The monosubstituted phenolic sulfides which are used as stabilizing agents in preparing the stabilizing compositions of the invention can be depicted by the following structural formula:

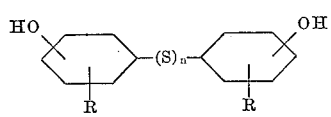

wherein R designates a hydrocarbon residue and can be an alkyl radical of from 1 to 20 carbon atoms, e.g. methyl, ethyl, isopropyl, n-propyl, n-butyl, tert-butyl, sec-butyl, n-amyl, sec-amyl, tert-amyl, n-hexyl, sec-hexyl, n-heptyl, sec-heptyl, tert-octyl, sec-octyl, isooctyl, nonyl, decyl, dodecyl, tridecyl, n-tetradecyl, pentadecyl, hexadecyl, heptadecyl, octadecyl, etc., an aralkyl radical, e.g. benzyl, phenethyl, etc., a cycloalkyl radical, e.g. cyclopentyl, cyclohexyl, etc. or an aromatic hydrocarbon radical of the benzene series, e.g. phenyl, lower alkoxyl phenyl, lower alkyl phenyl, etc. and $n$ is an integer of from 1 to 2. The preferred configuration is that wherein the R and OH substituents are never meta to each other and the OH function is excluded from occupying a position meta to the sulfur bridge.

It is to be understood that the aforenamed bis phenols are symmetrical structures and that the phenolic functions and the R groups each occupy similarly disposed positions on the aromatic rings.

Exemplary bis phenols falling within the ambit of the above depicted general formula includes the following:

*Bis phenol sulfides*

Compound 1.—4,4'-thiobis (2-sec-amylphenol)

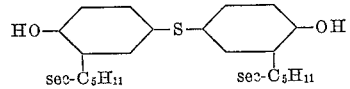

Compound 2.—4,4'-thiobis (2-isopropylphenol)

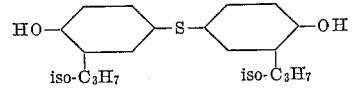

Compound 3.—2,2'-thiobis (4-benzylphenol)

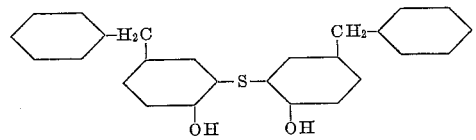

Compound 4.—4,4'-thiobis (2-benzylphenol)

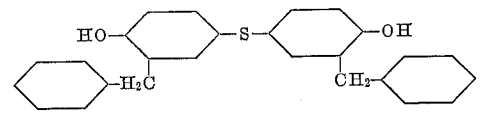

Compound 5.—4,4'-thiobis (2-sec-butylphenol)

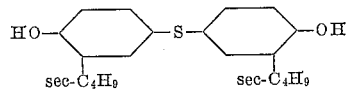

Compound 6.—4,4'-thiobis (2-cyclohexylphenol)

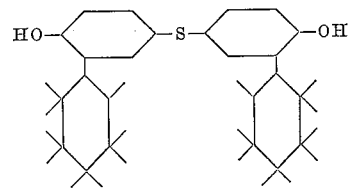

Compound 7.—4,4'-thiobis (2-tert-butylphenol)

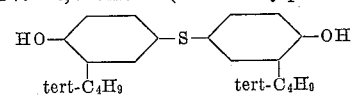

Compound 8.—4,4'-thiobis (2-phenylphenol)

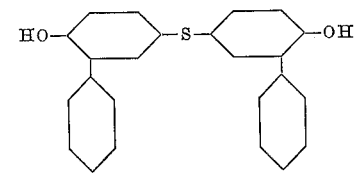

Compound 9.—4,4'-thiobis (2-cyclopentylphenol)

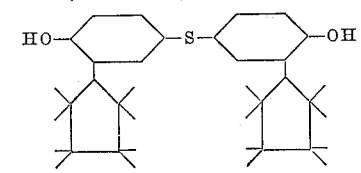

Compound 10.—2,2'-thiobis (4-p-methoxyphenylphenol)

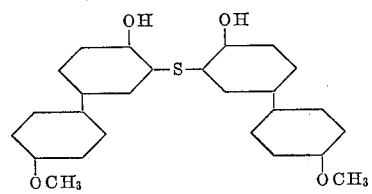

Compound 11.—2,2'-thiobis (4-tetradecylphenol)

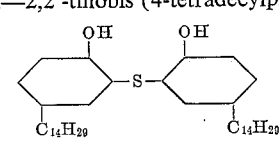

Compound 12.—4,4'-thiobis (2-isooctylphenol)

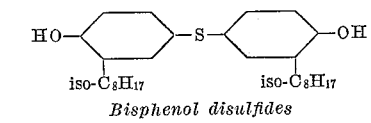

*Bisphenol disulfides*

Compound 13.—4,4'-dithiobis (2-sec-amylphenol)

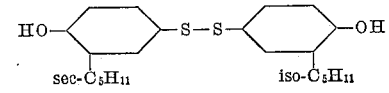

Compound 14.—4,4'-dithiobis (2-isopropylphenol)

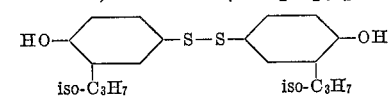

Compound 15.—4,4'-dithiobis (2-cyclohexylphenol)

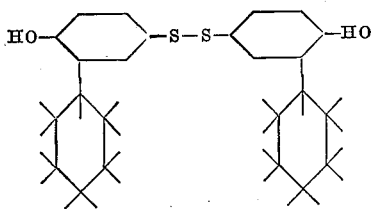

Compound 16.—4,4'-dithiobis (2-tert-butylphenol)

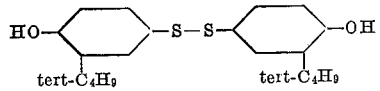

Compound 17.—4,4'-dithiobis (2-phenylphenol)

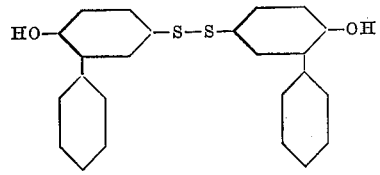

Compound 18.—4,4'-dithiobis (2-sec-butylphenol)

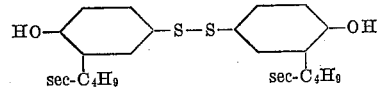

Compound 19.—2,2'-dithiobis (4-tert-octylphenol)

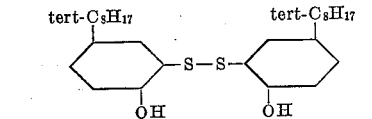

Compound 20.—2,2'-dithiobis (4-isopropylphenol)

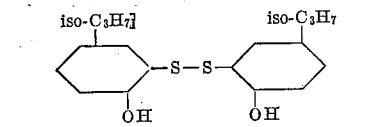

Compound 21.—2,2'-dithiobis (4-sec-butylphenol)

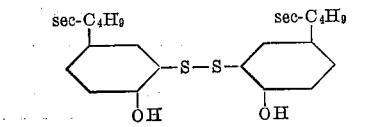

Compound 22.—4,4'-dithiobis (2-cyclopentylphenol)

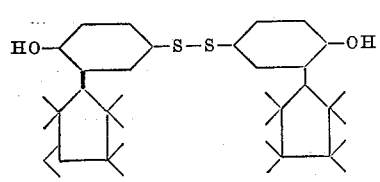

Compound 23.—4,4'-dithiobis (2-n-tetradecylphenol)

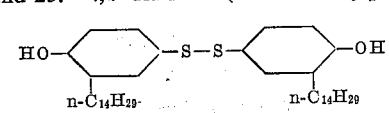

Compound 24.—4,4'-dithiobis (2-benzylphenol)

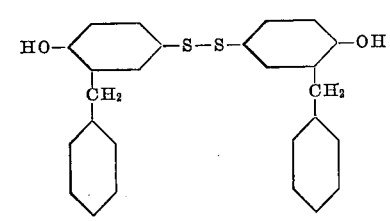

Compound 25.—2,2'-dithiobis (4-p-methoxyphenylphenol)

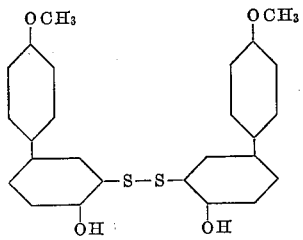

Compound 26.—4,4-dithiobis (2-p-tolyphenol)

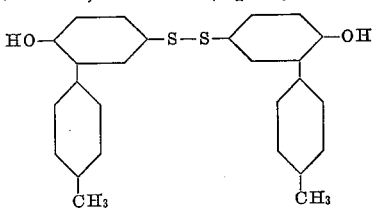

Compound 27.—4,4'-dithiobis (2-methylphenol)

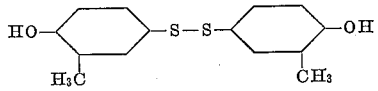

The bis (monoalkylphenol) sulfides and disulfides as used herein are in some instances known chemical compounds and can be prepared by reacting approximately 2 moles of a monocyclic phenol having a hydrocarbon substituent in either the second or fourth position with the requisite sulfur chloride. The procedure was patterned after the method of preparing bis (dialkylphenols) as set forth in British Patent 796,285.

As can be seen from an inspection of the general formula, the phenolic stabilizers herein fall into two categories, i.e. phenol sulfides on the one hand and phenol disulfides on the other. In general, it has been our finding that the phenolic disulfides are more efficient than the monosulfides in formulating the stabilizing compositions of the present invention. However, as a class, the bis phenols of the invention have proved to be superior to the disubstituted disulfides of the prior art as stabilizers for isotactic polypropylene.

The stabilizer compositions described herein can be used in conjunction with the alkyl esters of 3,3'-thiodipropionic acid and in this connection reference is made to the dilauryl ester. As is well known in the art, esters of 3,3'-thiodipropionic acid synergize the stabilizing action of phenolic stabilizers and we have found this relationship to hold true for the compositions of the present invention. The 3,3'-thiodipropionic acid dilauryl ester is commonly employed in a concentration varying from about .01 to about 5% of the stabilized polymer mixture. The degree of stabilization of isotactic propylene using the compositions described herein is essentially of the same order attained with the stabilizer disclosed in the previously referred to pending application.

Reference is now made to the following examples although their inclusion is not to be taken as limiting or otherwise imposing any restriction on the invention and it is to be understood that variations in practicing the same without departing from the scope or spirit thereof will be apparent to those skilled in the art to which the said invention pertains.

EXAMPLE 1

100 g. of unstabilized isotactic polypropylene was intimately mixed with 0.2 g. of a stabilizer composition consisting of a 50/50 ratio of 4,4'-dithiobis (2-cyclohexylphenol) and calcium stearate and the resulting mixture milled for 10 minutes at 340° F. followed by molding for 15 minutes at 419° F. The resulting transparent plastic sheet exhibited no noticeable stain or discoloration.

A Waring blendor was used in mixing the polymer and stabilizer composition.

EXAMPLE 2

The procedure of Example 1 was again followed but in this instance there was incorporated in the product 0.25% of the dilauryl ester of 3,3′-thiodipropionic acid.

EXAMPLE 3

Following the procedures given in the previous examples, the unstabilized isotactic polypropylene was blended with a stabilizer composition consisting of a 50/50 ratio of the calcium salt of monodecyl phosphoric acid and 4,4′-dithiobis (2-cyclohexylphenol). The results in this instance parallelled the results as obtained in the case of the previous examples.

EXAMPLE 4

The procedures of Example 1 was again carried out but in this instance the stabilizer composition consisted of a 50/50 mixture of a calcium salt of monolauryl phosphoric acid and 4,4′-diothiobis (2-cyclohexylphenol).

The polypropylene resin as used in the above described examples was an unstabilized general purpose high molecular weight polypropylene resin of the isotactic or crystalline type. A typical isotactic resin has a melt index of 4 at 230° C. and a specific gravity of 0.905. An example of this type of polypropylene resin can be purchased from the Hercules Powder Company under the trade name Profax and further identified as Number 6501, Type P–02004 and is supplied in the form of natural flakes. We have used other commercially available grades of unstabilized isotactic polypropylene resins and in this connection, mention is made of:

(1) Unstabilized Avisun Polypropylene (Avisun Corporation)

(2) Unstabilized Escon Polypropylene (Enjay Chemical Company—Division of Humble Oil and Refining).

We claim:

1. A solid substantially linear polypropylene stabilized against discoloration and thermal degradation comprising in combination with the polypropylene a mono-substituted phenolic disulfide of the following formula:

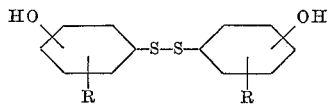

wherein R is a hydrocarbon residue selected from the class consisting of alkyl of from 1 to 20 carbon atoms, cyclopentyl, cyclohexyl, benzyl and phenyl, said R and OH never being meta with respect to each other, it being further provided that the OH function is excluded from occupying a position meta to the disulfide bridge, and a metallic salt consisting of the soap of calcium, barium, strontium, magnesium and zinc, the ratio of the phenolic disulfide to metallic soap ranging from about 1:12.5 to about 1:0.5.

2. A composition according to claim 1 wherein the bis phenol is 4,4′-dithiobis (2-cyclohexylphenol).

3. A composition according to claim 1 wherein the bis phenol is 4,4′-dithiobis (2-tert-butylphenol).

4. A composition according to claim 1 wherein the bis phenol is 4,4′-dithiobis (2-phenylphenol).

5. A composition according to claim 1 wherein the bis phenol is 4,4′-dithiobis (2-sec-butylphenol).

6. A composition according to claim 1 wherein the bis phenol is 2,2′-dithiobis (4-sec-butylphenol).

7. A polypropylene composition stabilized against discoloration and thermal degradation comprising a solid substantially linear polypropylene and as a stabilizer therefor 0.135% to 5.250% of a mixture of a monosubstituted bis phenolic disulfide of the following formula:

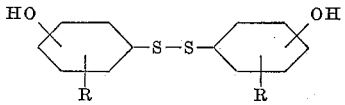

wherein R is a hydrocarbon residue selected from the class consisting of alkyl of from 1 to 20 carbon atoms, cyclopentyl, cyclohexyl, benzyl and a phenyl, said R and OH never being meta with respect to each other, it being further provided that the OH function is excluded from occupying a position meta to the disulfide bridge, and a metallic salt consisting of the soap of calcium, barium, strontium, magnesium and zinc, the ratio of the phenolic disulfide to metallic soap ranging from about 1:12.5 to about 1:0.5.

8. A composition according to claim 7 wherein the dilauryl ester of 3,3′-thiodipropionic acid is used as a synergist.

9. A polypropylene composition according to claim 7 wherein the monosubstituted bis phenolic disulfide is 4,4′-dithiobis (2-cyclohexylphenol).

10. A polypropylene composition according to claim 7 wherein the monosubstituted bis phenolic disulfide is 4,4′-dithiobis (2-tert-butylphenol).

11. A polypropylene composition according to claim 7 wherein the monosubstituted bis phenolic disulfide is 4,4′-dithiobis (2-phenylphenol).

12. A polypropylene composition according to claim 7 wherein the monosubstituted bis phenolic disulfide is 4,4′-dithiobis (2-sec-butylphenol).

13. A polypropylene composition according to claim 7 wherein the monosubstituted bis phenolic disulfide is 2,2′-dithiobis (4-sec-butylphenol).

References Cited

UNITED STATES PATENTS

| | | | |
|---|---|---|---|
| 2,175,082 | 10/1939 | Hagen et al. | 260—45.95 |
| 2,310,449 | 2/1943 | Lightbown et al. | 260—45.95 |
| 2,964,498 | 12/1960 | Taylor | 260—45.95 |
| 2,967,850 | 1/1961 | Hawkins et al. | 260—45.9 |
| 2,985,617 | 5/1961 | Salyer et al. | 260—45.95 |
| 3,033,814 | 5/1962 | Tholstrup | 260—45.95 |
| 3,038,878 | 6/1962 | Knowles, et al. | 260—45.95 |
| 3,082,187 | 3/1962 | Fuchsman et al. | 260—45.95 |
| 3,057,926 | 10/1962 | Coffield | 260—45.95 |
| 3,070,569 | 12/1962 | Rosenthal | 260—45.9 |
| 3,129,213 | 4/1964 | Worrel | 260—45.95 |

FOREIGN PATENTS

| | | |
|---|---|---|
| 878,868 | 10/1961 | Great Britain. |
| 890,468 | 2/1962 | Great Britain. |

DONALD E. CZAJA, *Primary Examiner.*

L. J. BERCOVITZ, *Examiner.*

H. E. TAYLOR, *Assistant Examiner.*